United States Patent [19]
Caron et al.

[11] Patent Number: 5,795,097
[45] Date of Patent: Aug. 18, 1998

[54] TRANSFER STATION WHEELS

[75] Inventors: James O. Caron, Modesto; Scott F. P. Caron, Salida, both of Calif.

[73] Assignee: Caron Compactor Company, Modesto, Calif.

[21] Appl. No.: 859,014

[22] Filed: May 20, 1997

Related U.S. Application Data

[63] Continuation of Ser. No. 404,343, Mar. 15, 1995, abandoned.

[51] Int. Cl.⁶ .................................................. E01C 19/23
[52] U.S. Cl. ........................ 404/121; 404/124; 301/44.1; 301/44.2
[58] Field of Search ....................... 172/122, 554; 301/43, 44.1, 44.2, 44.3, 44.4; 404/121, 122, 124, 129, 128

[56] References Cited

U.S. PATENT DOCUMENTS

| | | | |
|---|---|---|---|
| 781,573 | 1/1905 | Todd | 301/44.2 X |
| 1,658,623 | 2/1928 | Wittkopp | 301/44.1 X |
| 2,039,521 | 5/1936 | Cunnington | 301/44.2 |
| 2,090,696 | 8/1937 | Moening | 301/44.2 X |
| 3,650,185 | 3/1972 | Takata | 301/43 X |
| 4,919,566 | 4/1990 | Caron et al. | 404/121 |
| 5,078,454 | 1/1992 | Rollinson | 301/44.1 |
| 5,390,985 | 2/1995 | Chandler | 301/44.2 |

FOREIGN PATENT DOCUMENTS

| | | | |
|---|---|---|---|
| 976768 | 3/1951 | France | 301/44.2 |
| 609473 | 9/1948 | United Kingdom | 301/44.2 |

*Primary Examiner*—James Lisehora
*Attorney, Agent, or Firm*—Flehr Hohbach Test Albritton & Herbert, LLP

[57] ABSTRACT

A wheel for a powered vehicle operating along a hard brittle surface is equipped with cleats 21 having non-metallic wear tips 31 mounted upon a metallic base 36 welded to the wheel circumference 10. The material forming the wear tips 31 has density and hardness insufficient to chip or erode the brittle work surface but of sufficient toughness for demolition of solid wastes. An elongate bracket in a medial portion 26 of the wear tip and base have complimentary portions for attachment of tip to base in a twist resisting connection. An adhesive bond unites the tip and base in one embodiment, FIGS. 4–7, and mechanical couplings unite the parts in others, FIGS. 7–13. Certain embodiments, FIGS. 8–13, have provisions for readily releasable locking of the parts for field replacement of worn cleats.

11 Claims, 5 Drawing Sheets

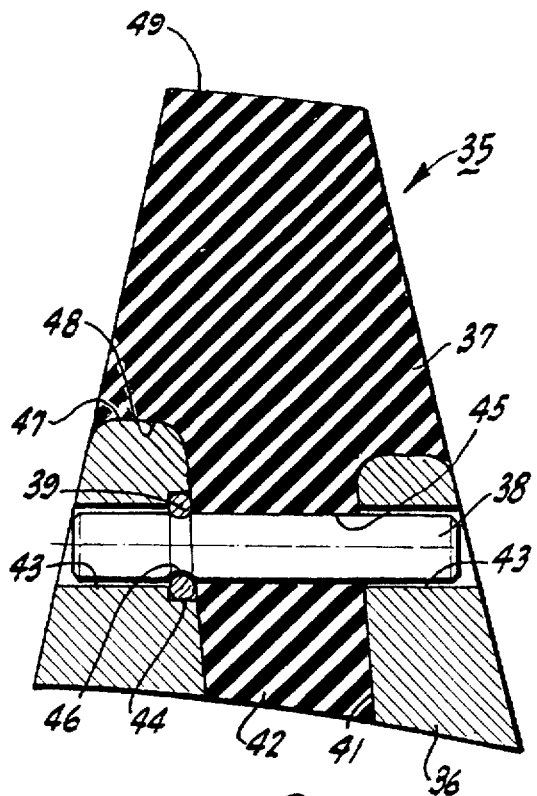
FIG_9
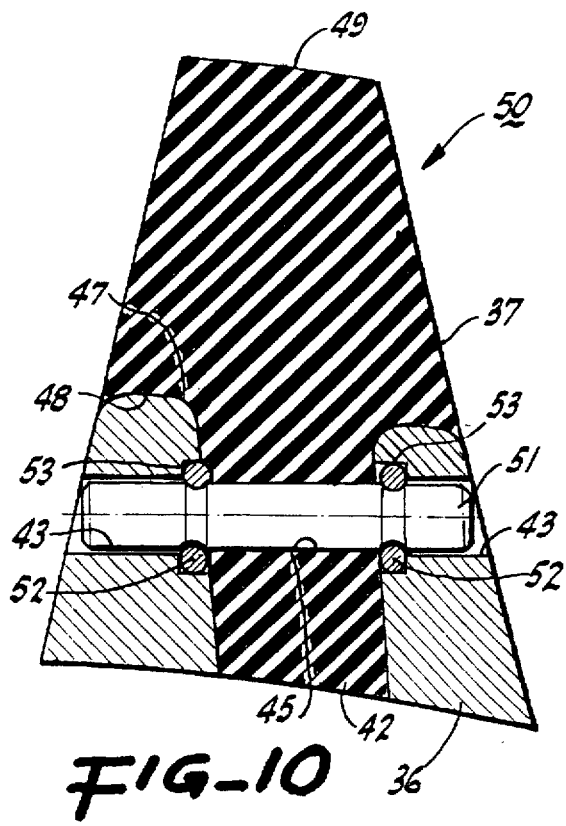
FIG_10
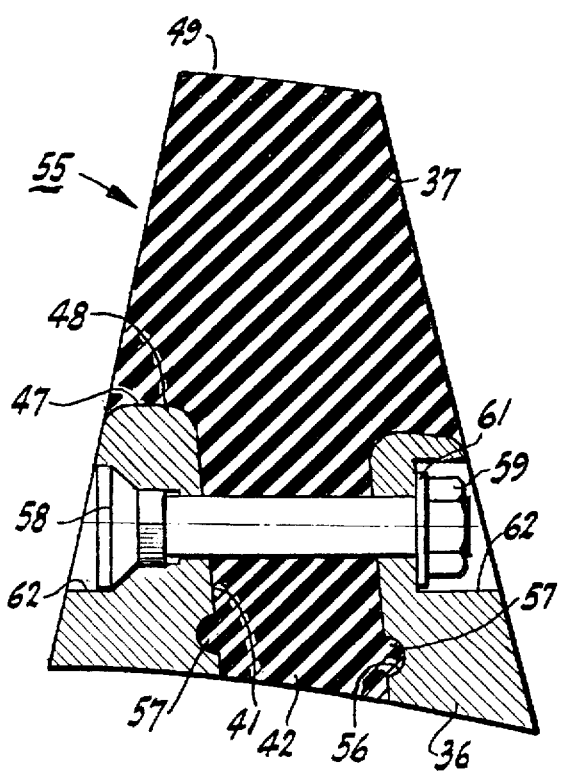
FIG_11
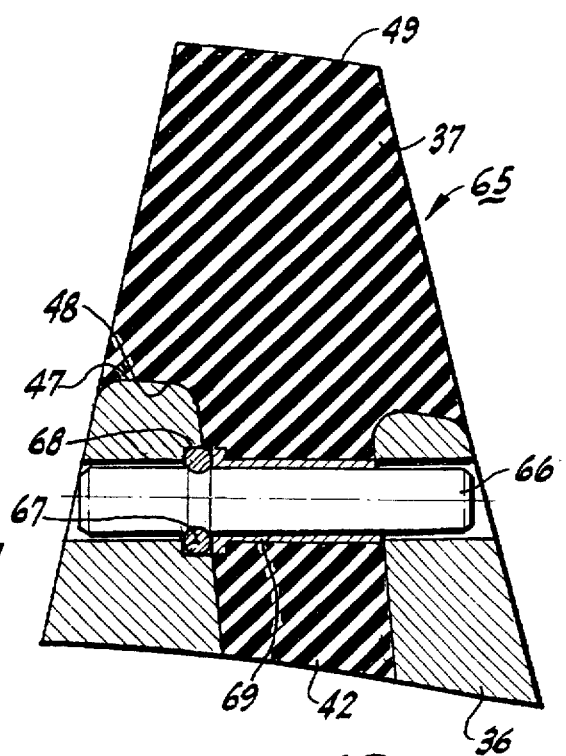
FIG_12

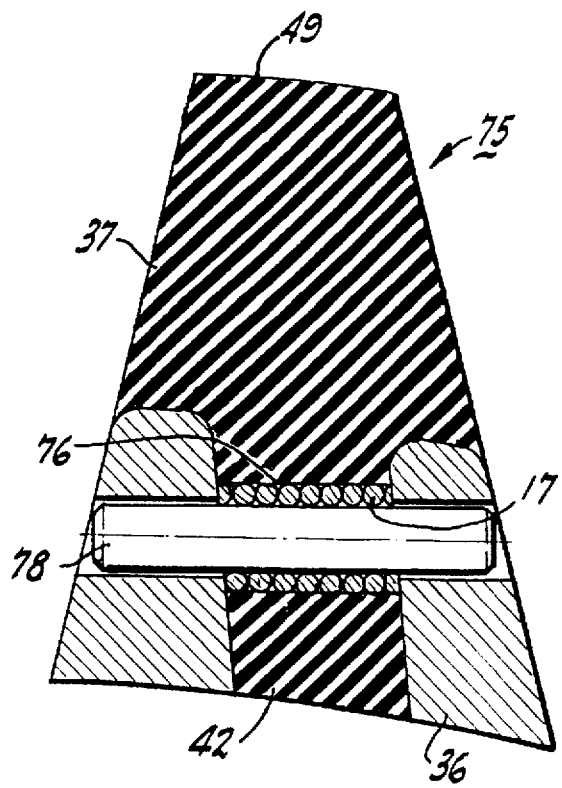
FIG_14
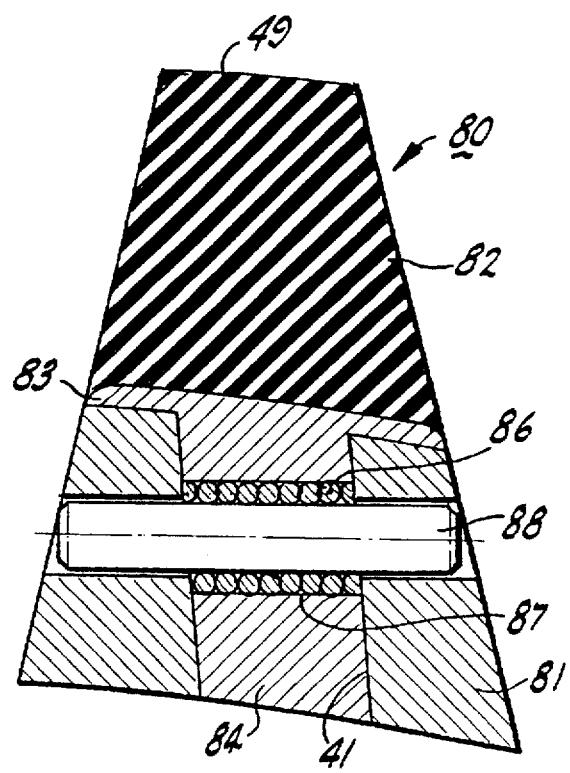
FIG_15
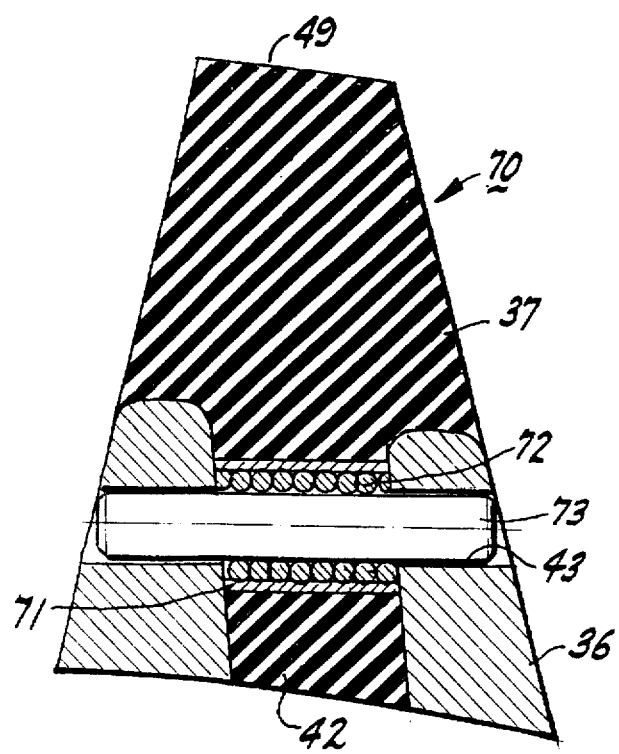
FIG_13

TRANSFER STATION WHEELS

This is a continuation of application Ser. No. 08/404,343, filed Mar. 15, 1995, now abandoned.

BACKGROUND OF THE INVENTION

This invention generally concerns compaction machinery such as wheels for mounting upon a driven compaction vehicle, the wheels having both destructive and tractive characteristics adapted to breakup, crush, grind and compact materials as encountered in solid waste transfer stations. More particularly, this invention is characterized by wheels with cleats carried by the roller which operates along a hard, brittle surface, the cleats preserving the surface from chipping and abrasion.

Compaction rollers and wheels used on solid waste management projects and particularly at sanitary landfills and transfer station operations are equipped generally with cleats or feet of a type for grinding and crushing materials to reduce the size and bulk of the material. As shown in U.S. Patents assigned to the Caron Compactor Company, Nos. 4,919,566 and 3,922,106, sanitary fill compaction wheels were disclosed and employed types of cleats with steel wearcaps as a part of cleat assembly. The wearcaps were replaceable either by dismounting after removal of a fastener or through use of a cutting torch to remove the welde metal securing the cleat to the drum.

While the foregoing arrangements operate entirely satisfactory in the context of a sanitary landfill operation, when such steel-tipped cleats are operated in a transfer station, the destructiveness of the roller wears through the concrete floor. More particularly, transfer stations serve the purpose of providing a deposit point where the trash collection trucks may discharge their contents into a collection pit. The pit may be a generally rectilinear sunken structure having concrete ramps and floors so as to contain the residues within the transfer station and not permit residues to seep into the groundwater which is environmentally objectionable. The compaction vehicle operates on the trash deposited in the transfer station pit, moving backwards and forwards to break, crush and grind and compact materials which are later retrieved from the pit loaded into a semi tractor and carried for deposit to the sanitary landfill site. It has been found that the type of cleat satisfactory to the sanitary landfill site was entirely too destructive for use at the transfer station and consequently, modified cast steel cleats were devised so as to afford a continuous contact point with the supporting surface so as not to gouge out the concrete surface of the ramp or station floor. Even with such a modified cleat configuration for use at the transfer station, there still was encountered substantial wear and destructive action upon the concrete work floors.

Accordingly as disclosed herein, a transfer station wheel has been provided wherein the cleat assemblies are configured to minimize and materially reduce the erosion and chipping of the concrete support surfaces. In this way, the transfer station maintenance and repair intervals can be substantially extended.

As it has been observed that, in the use of two part cleat assemblies where a wearing portion is coupled to a fixed base, that the wearing portion is subjected to twisting forces capable of damaging the cleat assembly. A cleat assembly as disclosed herein includes means for a restraining twisting of the wearing portion relative to the base.

It is desirable that a two part cleat assembly be equipped so that the wearing portion can be readily removed using common tools available on the job site. In this way, replacement of the worn portion is encouraged before the supporting base becomes worn to a point requiring its removal as unusable.

In cleat assemblies having a supporting base portion welded to a rim of a roller, it has been observed that the weldment should be protected to the extent possible. As disclosed herein, the wearing portion of the cleat assembly in certain embodiments overlays the weldment to a degree to protect them.

SUMMARY OF THE INVENTION AND OBJECTS

In general, an improved transfer station wheel carries cleat assemblies comprising a rigid mounting base assembly adapted to be welded to the rigid cylindrical body. The cleat assemblies comprise the metallic base portion and a non-metallic wearable wear tip portion which protrudes generally outwardly from the base portion. The wear tip is formed from a material having hardness and density insufficient to chip or erode the concrete floor surfaces of the transfer station but is sufficiently hard for demolition of the solid waste encountered at the transfer station. In one embodiment, the wear tip is secured to the metallic base by adhesive means. In other embodiments, mechanical means couple the wear tip to the base portion, permitting ready replacement of the wear tip after the end of its useful service life.

In general, it is an object of the present invention to provide an improved transfer station wheel having cleats characterized by a wear tip portion which does not chip or erode hard brittle surfaces such as the concrete floors of a transfer station.

It is another object of the invention to provide an improved transfer station cleat assembly in which the wear tip can be readily replaced so as to avoid wearing away the mounting base carrying such wear tip.

Another object of the invention is to provide a cleat assembly of the type requiring minimal down time and labor to replace the worn portions while using simple ordinary tools.

It is a further object of the invention to provide an improved cleat assembly for a transfer station wheel characterized by means restraining twisting between the wear tip and the supporting base.

It is yet another object of the invention to provide a cleat assembly for a transfer station wheel wherein the wear tip overlays the weldments securing the base to a wheel drum.

Yet a further object of the invention is to provide a cleat assembly having a readily replaceable wear tip unit selectively retainable by a pin disposed through side walls of the base.

A further object of the invention is to provide a cleat assembly having a readily removable wear tip having a bracket thereon for engaging a cavity in the support base welded to the wheel rim so as to prevent twisting of the wear tip relative to the base.

An additional object of the invention is to provide a cleat assembly for a transfer station wheel having a readily removable wear tip unit serving to engage the supporting base in a manner inhibiting twisting of the shoe with respect to the base.

The foregoing and other objects of the invention will become more readily evident from the following detailed description of the preferred embodiments when considered in conjunction with the drawings.

BRIEF DESCRIPTION OF THE DRAWINGS

FIG. 9 is a view like FIG. 4 but depicting the base assembly and wear tip of the embodiment of FIG. 8;

FIG. 10 is a view like FIG. 9 but showing yet another embodiment of the invention;

FIG. 11 is a view like FIG. 8 but showing still another embodiment of the present invention;

FIG. 12 is a view like FIG. 9 but showing a further embodiment of the invention;

FIG. 13 is a view like FIG. 9 but showing a still further embodiment of the present invention;

FIG. 14 is a view like FIG. 9 but showing a yet further embodiment of the present invention; and FIG. 15 shows still another preferred embodiment of the present invention.

DESCRIPTION OF THE PREFERRED EMBODIMENTS

Figure 1:
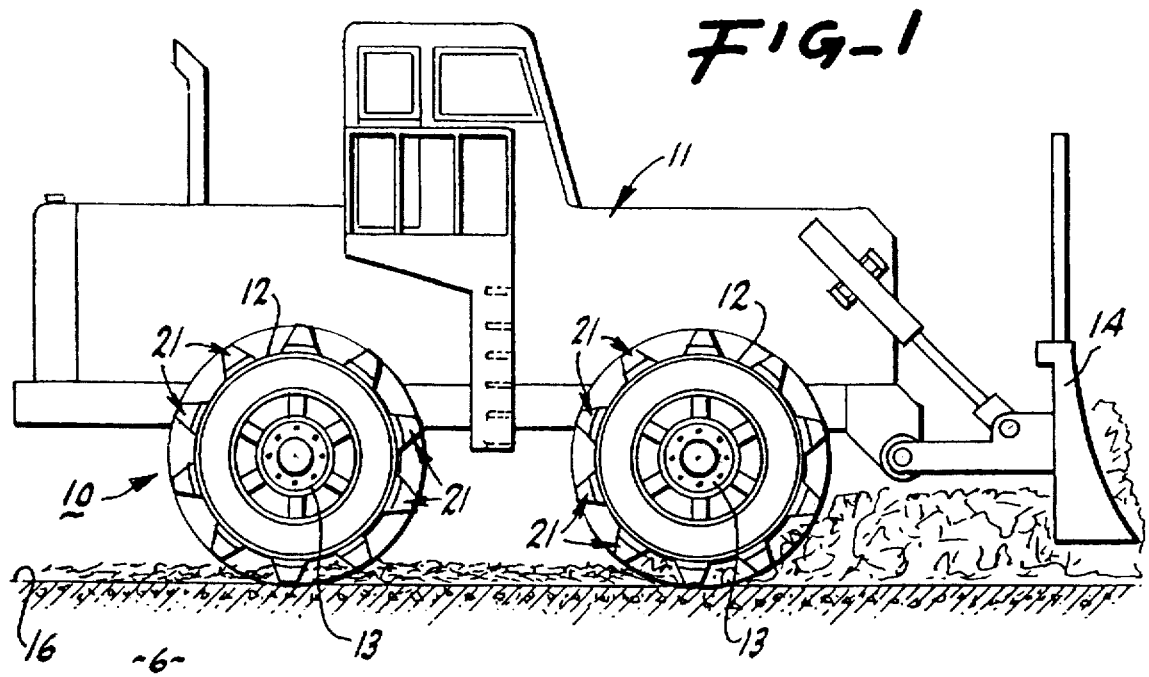
FIG. 1 is a side elevational view of a compaction machine equipped with the improved transfer station wheels of the present invention.
Figure 2:
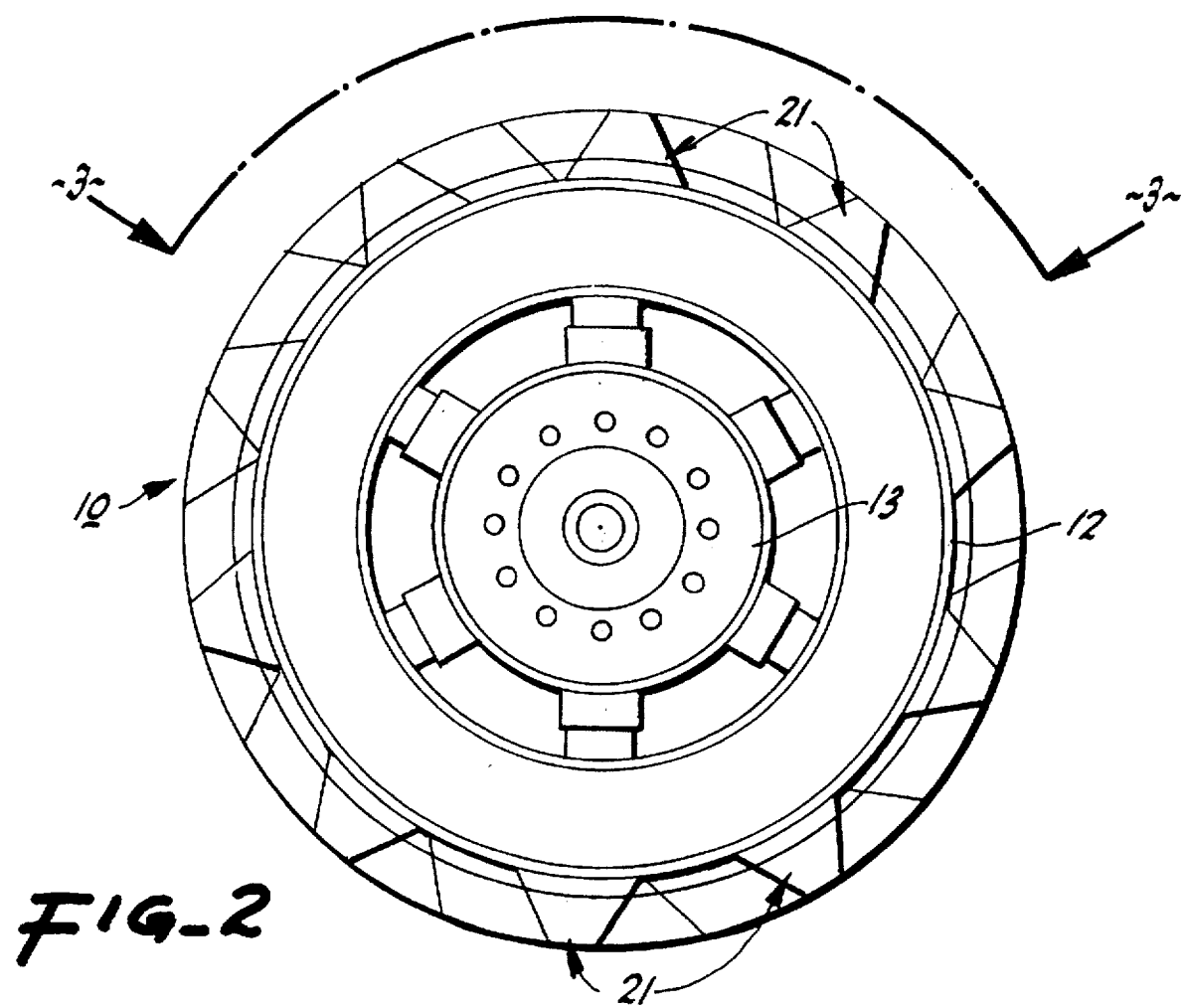
FIG. 2 is an enlarged elevational view of the improved transfer wheel of the present invention.

An improved trash station wheel 10, constructed according to the present invention, is shown in FIG. 1 of the drawings mounted upon a power-driven vehicle 11. The wheel 10 includes a rigid cylindrical body or rim 12 connected to a centrally disposed drum 13 and the rim and drum so illustrated can be constructed according to U.S. Pat. No. 3,724,342, assigned to Caron Compactor Company, to incorporate cushioning elements and the like, shown best in FIG. 2.

A set of wheels 10 as shown in FIG. 1 is mounted upon a four-wheel compactor vehicle 11, having a trash blade 14 arranged at the forward end for heaving, shifting and distributing solid wastes such as encountered at a transfer station. Typically, the transfer station comprises a sizable pit with a concrete floor 16 and through action of the vehicle 11 equipped with the wheels 10, the initial commingling or homogenizing of refuse takes place in the pit at the transfer station, thereby allowing greater density capacity for the sanitary land fill where the waste is taken after compaction treatment at the transfer station. It was found that the use of bare steel cleats, whether on a wheeled vehicle or track vehicle, damaged the concrete surface so much so that periodic repair and replacement were often required at substantial cost in down time at the transfer station. The wheel 10 in the present invention minimizes and substantially reduces the deleterious effects of the prior all-steel demolition wheels.

Figure 3:
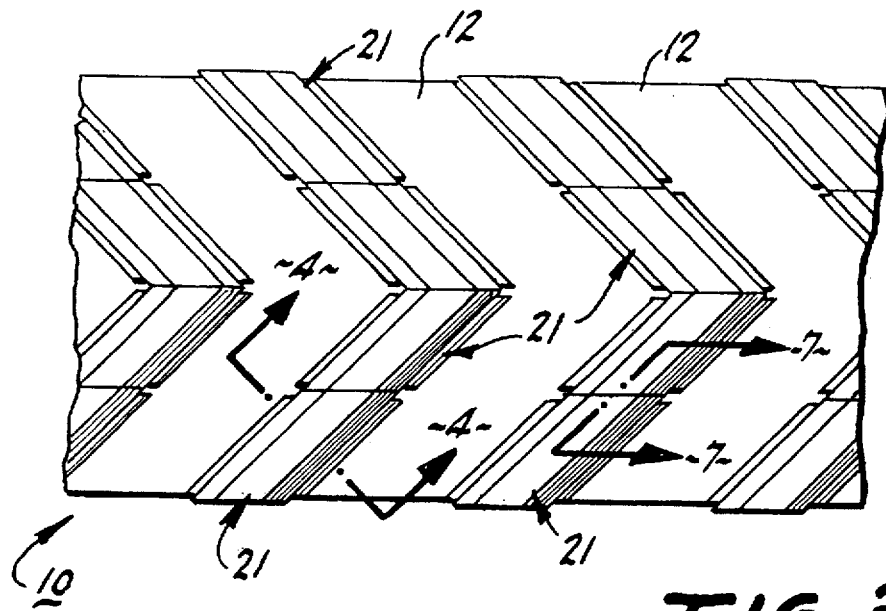
FIG. 3 is a fragmentary developed view of the cleat pattern of the wheel of FIG. 2 taken in the direction of the arrows 3—3 of FIG. 2.

To this end, the wheel 10 is equipped with an array of cleats 21 disposed in a chevron pattern with one apex of the chevron approximately in the medial portion of the rim 12, clearly shown in FIG. 3. The chevron pattern maintains continual contact as the wheel rolls over the waste. This improves maneuverability, stability and control of the vehicle as it mixes and compacts the refuse.

Figure 5:
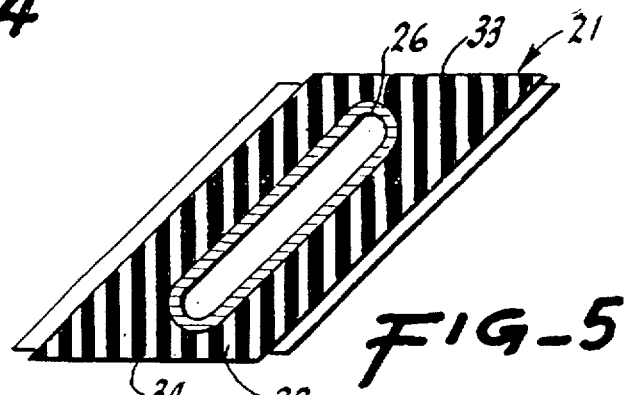
FIG. 5 is a sectional view taken in the direction of the arrows 5—5 of FIG. 4.

Each cleat 21, in plan view, has the outline of a parallelogram as clearly shown in FIG. 5 and when arranged end-to-end, as shown in FIG. 3, create the chevron configuration. Preferably each leg or arm of the chevron configuration comprises at least two cleats. The cleats are thus arranged in a segmented pattern with the end walls in substantial abutting relationship so as to minimize the capture of trash elements, such as wire between adjacent cleat segments.

Figure 4:
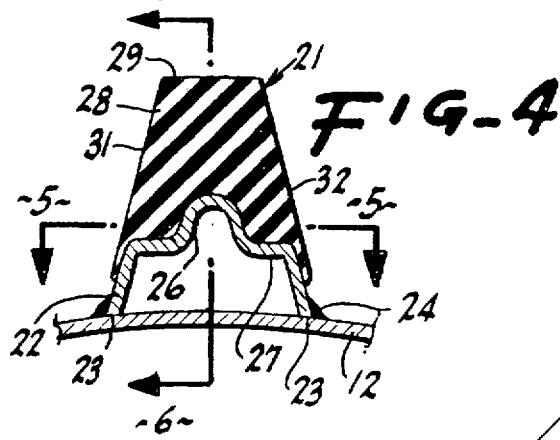
FIG. 4 is a sectional view taken in the direction of the arrows 4—4 of FIG. 3.
Figure 6:
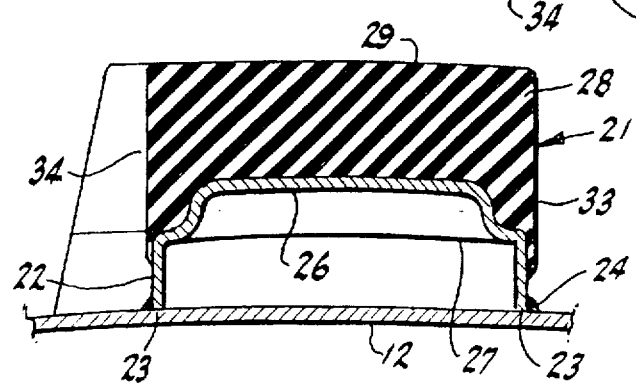
FIG. 6 is a sectional view taken in the direction of the arrows 6—6 of FIG. 4.

Referring specifically to FIGS. 4-6, each cleat assembly 21 includes a rigid metallic, such as cast steel, mounting pad or base 22 curved along the edge 23 to conform to the curvature of the rim 12 so as to be adapted to be welded to the rigid body formed by the rim 12 as indicated in FIGS. 4 and 6. There, the weld bead 24 is indicated as fixedly securing the hollow cast steel base portion 22 to the rim 12. The adoption of a hollow base configuration results in a substantial saving metal weight and consequent cost of the cleat 21. A bracket portion 26 formed integral with the base portion 22 protrudes generally radially outwardly therefrom in a medial portion thereof. The bracket 26 is elongate, as indicated in FIG. 5, extending substantially the greater portion of the length of the cleat 21. The bracket merges into shoulders 27 and together the bracket 26 and shoulders 27 provide a substantial area for the attachment of a hard, durable, long-wearing non-metallic wear tip 28. The wear tip may be formed from materials composed and having the characteristic set forth in the table below.

| *Stock # Description | 1125 STD Sheave Liner Stock | RXA3425 1156 W/Kevlar | HXA3423 HNBR | HXA3424 HNBR W/Kevlar |
|---|---|---|---|---|
| MOD 100, PSI | 828 | 1598 | 1181 | 2081 |
| MOD 200, PSI | 2225 | 2832 | 2547 | 2640 |
| TB, PSI | 3571 | 3262 | 4921 | 3864 |
| EB, % | 310 | 250 | 360 | 340 |
| DURO, PTS | 80 | 85 | 82 | 85 |
| SP GR, GMS/CC | 1.17 | 1.2 | 1.16 | 1.17 |
| Tear "C" LBS/IN | 288 | 256 | 390 | 382 |
| C/S % | 13.8 | 19.2 | 22.4 | 26 |

1. Banbury Mixed
2. Extruded Preform
3. Compression Molded

1125 & RXA3425 = Natural Rubber, Polybutadiene Polymers.
HXA3423 & HXA3424 = Hydrogenated Nitrile Butadiene Polymer.
*Stock number of Burke Industries, 2250 South Tenth Street, San Jose, California 95112

It has been found that the materials, as set forth above, have sufficient hardness and density to perform the task of compacting and homogenizing the solid waste material, but insufficient capabilities to chip or erode the concrete floor surface 16 of the transfer station.

Each wear tip includes a compaction face 29 disposed on the distal portion of the cleat, the cleat assembly including sloping outer side walls 31 and 32 which extend radially outwardly from the rim 12 to join with the compaction face 29, FIG. 4. Transversely extending end walls 33 and 34 extend between the side walls as shown in FIGS. 5 and 6 and are disposed substantially perpendicular to the wear face or compaction face 29.

Figure 7:
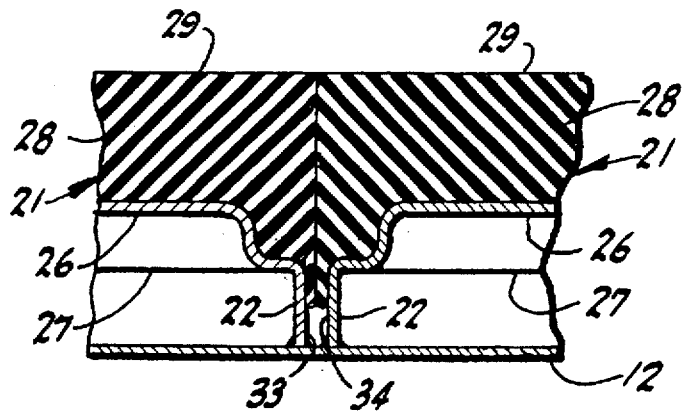
FIG. 7 is a fragmentary sectional view on an enlarged scale taken in the direction of the arrows 7—7 of FIG. 3.

Being that a substantial portion of the body of the wear tip 28 is formed of hard rubber constituents, it has been found practical in one embodiment of the invention to vulcanize the wear tip onto the metallic base of the mounting pad 22. Given that a substantial amount of interface area is provided by the central or medial bracket 26 and the adjacent shoulders 27, adhesion of the wear tip is greatly facilitated. Additionally, portions of the wear tip extend down along the walls of the base 22, as shown in FIG. 4, and thereby protect the base from the abrasive effects of the waste materials worked upon. Along the end walls 33 and 34, the non-metallic material extends a short distance down and over the base, such that when the segmented units are placed together, as indicated in FIG. 7, the bases 22 are spaced apart while the wear tips are abutting. Further, the longitudinally extending, outwardly protruding, medial bracket portion 26 serves to prevent the wear tip from being twisted laterally with respect to the base portion 22 during working operations.

In the foregoing, it will be readily evident that there has been provided an improved traction station wheel assembly, including cleats with non-metallic wear tips which can preserve the life of concrete work surfaces while still performing the active aggressive compaction work required at a sanitary waste transfer station.

Thus, there is saved the time and labor involved in replacing the concrete floors over which the compactor vehicle 11 operates, thus saving considerable down time and other expense.

OTHER EMBODIMENTS OF THE INVENTION

Other embodiments of the invention are shown in FIGS. 8–15 where the wheel rim has been omitted but it will be clearly understood that the cleat assemblies shown there are all intended to be secured to a rim 12 as described above in connection with the first embodiment. The embodiments of the invention illustrated in FIGS. 8–15 each comprise a metal base, preferably cast steel, and a non-metallic wear tip having a compaction face, the wear tip and supporting base being mechanically secured together in a manner which permits ready dismounting of the wear tip from the base for change and replacement of the wear tip in the field.

Figure 8:
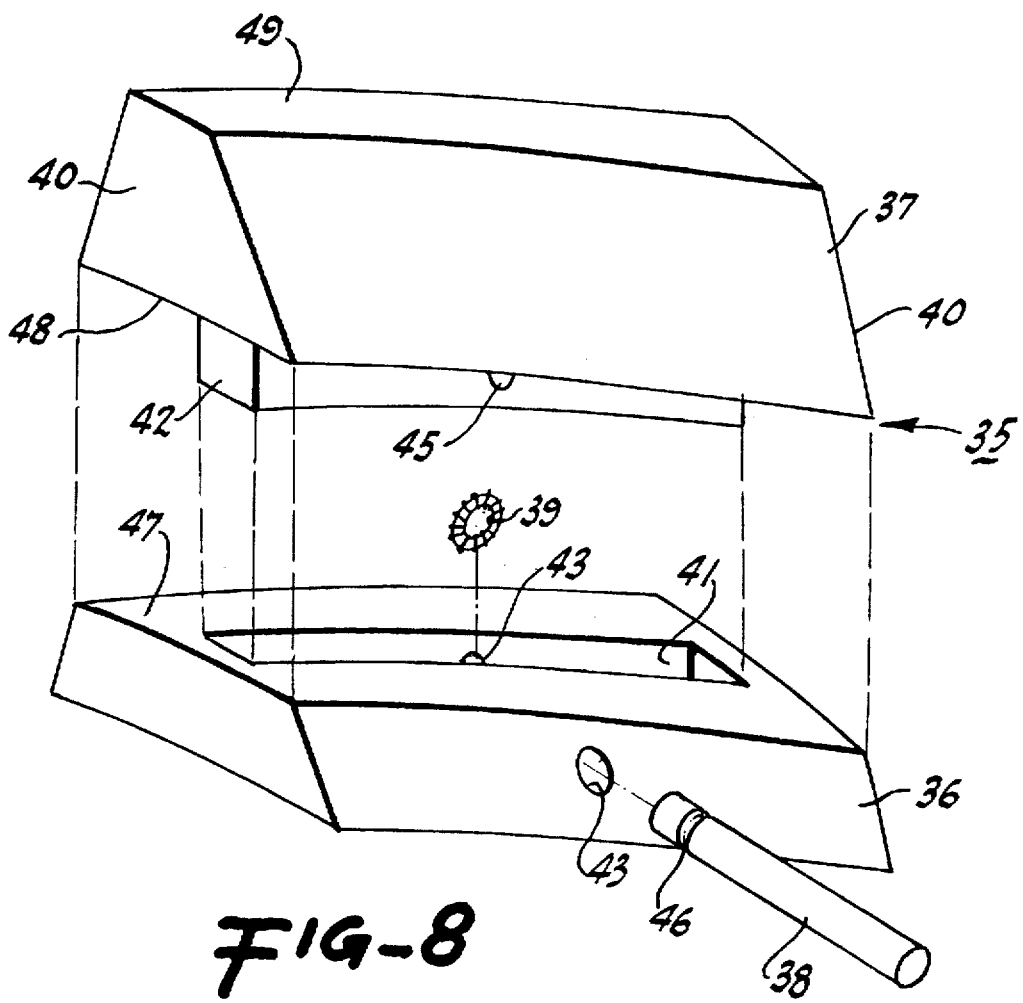
FIG. 8 is an enlarged, exploded perspective view showing another embodiment of the present invention.

More particularly, referring now to FIGS. 8 and 9, another embodiment 35 of the invention includes a steel base 36 and a non-metallic wear tip 37 which are held in the assembled position as shown in FIG. 9 by a grooved pin 38 and a ring retainer 39. The medial portion of the base or mounting pad 36 is provided with a cavity 41 which is complementary in form to a bracket 42 extending from the medial portion of the wear tip 37 and sized and configured to be snugly received in the cavity. An aperture 43 is provided through the base 36 and bracket sized to receive the pin 38. An inner wall of the cavity 41 is provided with an annular recess 44 sized to receive and seat the retainer 39 so that the groove 46 in the pin 38 will engage the retainer ring 39 in a snug fit upon being driven through the aperture 43 thereby to hold the tip 37 securely in place upon the mounting pad 36. It will be understood that the bracket 42 integral with the wear tip 37 is equipped with a bore 45 sized to receive the grooved pin 38.

Shoulder surfaces 47 with rounded edge portions are disposed on the outer face of the mounting pad 36 to receive and to support in a non-tipping relationship the wear tip 37. The shoulders 47 extend or surround the cavity 41 of the base 36 as is clearly apparent in FIG. 8. The wear tip 37 is provided with an engagement face 48 extending over the bracket 42 and when making contact with the shoulder 47 supports the wear tip 37 in a non-twisting, non-rocking condition. Twisting and rocking of components reduces their service life and frequently results in breakage and dislodgement of the wear cap from the base. Rounding of the metal edge portions of the shoulders 47 minimize the slicing or abrading action along the joint with the rubber wear tip which could result if a sharp metal edge and corner were permitted to engage the non-metallic wear tip.

Each wear tip is provided with a compaction face 49 and the cleat assembly, as shown in FIGS. 8–9, is formed such that the converging outer side walls extend radially outward from the base attachment zone to join with the compaction face. The transverse end walls 40 of the cleat 35 extend between the side walls and on the hard rubber wear tip 37 the end walls are adapted to overlie the end wall of the metal mounting pad 36 so that when cleats 35 are adjacent the wear tip 37 will be in engagement while the supporting pad 36 will be slightly spaced apart in a relationship like that shown in FIG. 7.

Another embodiment 50 of the invention is shown in FIG. 10 and similar parts are given similar part numbers from the embodiment shown and described in connection with FIGS. 8 and 9. The means for connecting the wear tip of embodiment 50 to the mounting pad 36 includes a double grooved pin 51 and a pair of circular retainers 52 received in complementary recesses 53 established in the bore 43 of the mounting pad 36. Preferably the retainer rings are split retainer rings which expand when the pin is driven through the bores 43, 45 and thus, the retainers expand to seat within the recesses 53. This makes an efficient and secure attachment of the wear tip to the supporting pad. The pin may be driven into or out of the bore by tools readily available in the field for dismounting a worn or damaged wear tip and for remounting a replacement.

A further embodiment 55 of the invention is shown in FIG. 11 and contains parts previously described and carrying the same numbers. The base or mounting pad 36 for the embodiment 50 is equipped within the medial cavity 41 with a lineal recess 56. The bracket 42 of the wear tip is equipped with protruding elements 57 for engagement with the recesses 56 to interlock the inner most portion of the bracket with the mounting pad 36. The recesses 56 and bracket 57 may extend co-extensively for substantially the entire length of the cavity 41 and bracket 42. Apertures are provided extending through the mounting pad 36 and the bracket 41 and are sized to receive a bolt 58 having a rectangular neck 60 under the head and having a nut 59 and washer 61 at the end, as shown. The pad 36 is provided with counter-sunk cavities 62 to receive the bolt head and rectangular neck 60 at one end and nut at the other in a relationship protecting them from abrasive contact with abrasive materials worked upon in transfer stations. The bolt assembly may be readily assembled and disassembled in the field through use of tools commonly carried by field mechanics when mounting or dismounting the wear tip 37 with respect to the pad 36. The presence of the elongated protrusion 57 on the bracket engaging the recess 56 further inhibits twisting and rocking of the wear tip with respect to the pad 36 while establishing a secure seat of the parts.

Yet another embodiment 65 of the invention is shown in FIG. 12 and includes parts previously described and carrying like numbers. The attachment means in the cleat assembly 65 includes a grooved pin 66, an associated retainer 67 received within a recess 68 in the base 36, and a metal bushing 69 extending through the bracket 42 of the non-metallic wear tip 37. The metal bushing affords an ease of insertion and removal of the pin 66 and reinforces the bore through the bracket 42.

Yet another embodiment of the invention is shown in FIG. 13 of the drawing where the cleat assembly 70 is shown as comprising parts previously described and carrying like numbers. The cleat assembly 70 is coupled together through the instrumentality of a metal bushing 71 impressed in the non-metallic bracket 42 of the wear tip 37. A coil spring-like element 72 is mounted within the bushing 71, the coil spring 72 having an inside diameter selected to strongly frictionally engage the outside diameter of the retainer pin 73 as it is driven through the aperture 43 in the base 36. Substantial frictional forces are established between the spring 72 and pin 73 and secure the tip 37 to the base 36. The pin 73 may be driven out through use of a drift pin (not shown) for mounting the wear tip for replacement purposes.

Still another embodiment of the invention is shown in FIG. 14 and includes the cleat assembly 75 which includes parts previously described and carrying like numbers. An aperture 76 is provided in the bracket 42 of the wear tip 37 having a diameter to receive a coil spring 77 with an inside diameter so selected to frictionally engage the retainer pin 78.

A further embodiment of the invention is shown in FIG. 15 and includes the cleat assembly 80. The assembly comprises the metal mounting pad 81 enabling the cleat assembly 80 to be welded to the cylindrical body or rim of the wheel drum, and a non-metallic wear tip 82 having a metal insert 83 vulcanized to the rubber material of the tip 82. The insert includes a bracket 84 for receipt within the recess or cavity 41 in the base 81. A spring 86 is received within a bore 87 of the insert to frictionally cooperate with the pin 88 for holding the tip assembly to the base 81.

While there has been described above several different embodiments, the invention, as will be apparent to those skilled in the art, may be modified and changed to suit different conditions. However, irrespective of those modifications the invention shall be limited only by the terms of the following claims.

We claim:

1. An improved transfer station wheel for mounting on a powered vehicle which operates along a hard brittle surface such as concrete to provide reduction of the waste volume through demolition of solid waste at transfer station sites, the combination comprising:

a rigid cylindrical body supported for rotation from such vehicle's chassis and having cleat assemblies carried by the body, the cleat assemblies being elongate and arranged end to end in a segmented array disposed in a chevron configuration along said cylindrical body, each cleat assembly having a hollow metallic base portion welded to said cylindrical body and a hard, durable, long wearing non-metallic wear tip fixedly secured to said base portion, said wear tip being formed from a material having a hardness and density insufficient to chip or erode the concrete floor surfaces of such transfer station and sufficiently hard for demolition of solid wastes, said non-metallic wear tip protruding generally radially outwardly from said base portion, a compaction face substantially narrower than said base portion on the outer distal surface of the non-metallic wear tip, each cleat assembly including sloping upwardly converging outer side walls extending radially outwardly from the cylindrical body sufficiently in a given direction to join with said compaction face, transverse end walls extending between the ends of said side walls, and means disposed in a medial portion of said base portion extending between said end walls serving to engage a complimentary shaped portion of said wear tip for securing said wear tip to said base portion and serving to resist twisting forces imparted to said wear tip.

2. The transfer station wheel of claim 1 wherein said medially disposed means comprises a bracket formed by an upwardly protruding portion of said base and a complimentary recess in said wear tip.

3. The transfer station wheel of claim 1 wherein the metallic base portion and the non-metallic wear tip of the cleat assemblies are adhesively secured together.

4. The transfer station wheel of claim 1 wherein said medially disposed means comprises a downwardly projecting bracket on said wear tip and a complimentary recess in said base portion serving to receive said bracket therein, said bracket and base portion having aligned coupling openings there through and coupling means extending through said coupling openings serving to maintain said bracket in said recess over the service life of said wear tip and means for readily releasably locking said coupling means in said openings to prevent decoupling of said wear tip from said cleat assembly.

5. The combination of claim 4 wherein said coupling means comprises a bolt and nut assembly.

6. The combination of claim 4 wherein said coupling means comprises a coupling pin disposed through said coupling openings and having at least one circumferential groove in the surface thereof and wherein said releasable locking means comprises an encircling spring member frictional seating in the groove.

7. The combination of claim 4 wherein said coupling means comprises a coil spring like member disposed in the coupling opening carried by the downwardly projecting bracket of said wear tip, and a cylindrical pin having a diameter permitting it to be forcibly driven axially through said spring for frictional engagement therewith.

8. The combination of claim 4 wherein the sidewalls of said base portion have protective recesses therein communicating with said coupling openings serving to shield said coupling means from the abrasive effects of working in solid waste trash.

9. The transfer station wheel of claim 1 wherein said chevron in which said cleat assemblies are configured comprises two arms and said cleat assemblies are arranged with at least two cleat assemblies disposed in at least one arm of the chevron.

10. The transfer station wheel of claim 9 wherein said chevron includes an apex established by the junction of said two arms, said apex being disposed substantially in a medial portion of said rigid cylindrical wheel body.

11. The transfer station wheel of claim 9 wherein said cleat assemblies are shaped as a parallelogram in plan outline.

* * * * *